Figure 1:
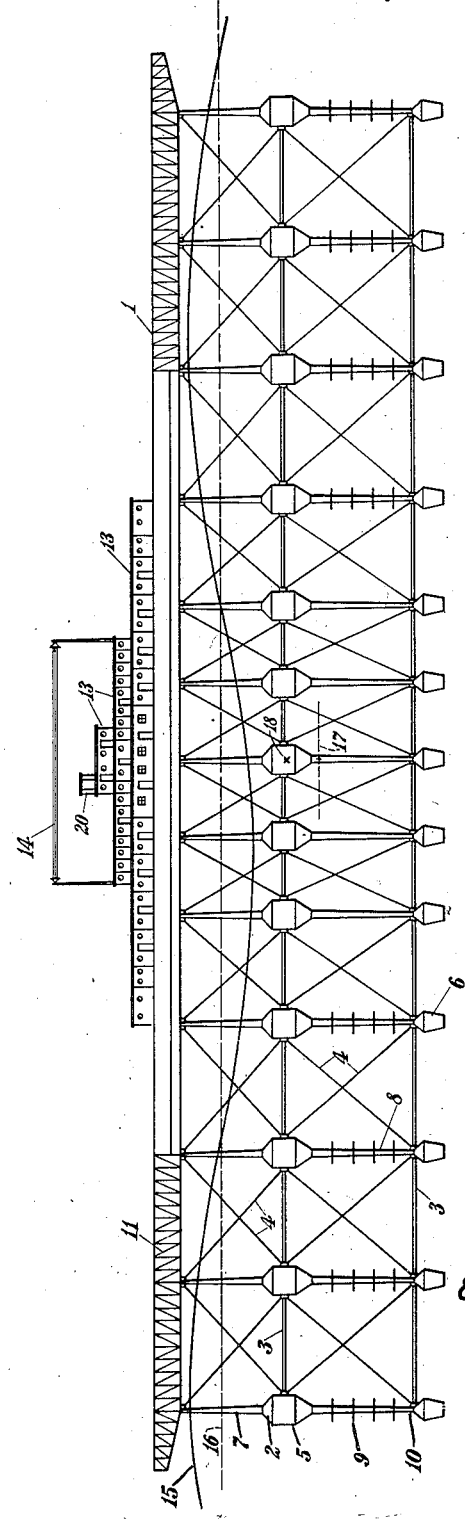

Oct. 7, 1924.

E. R. ARMSTRONG
SEA STATION
Filed Nov. 7, 1922

1,511,153

2 Sheets-Sheet 1

Edward R Armstrong
Inventor

Oct. 7, 1924.

E. R. ARMSTRONG
SEA STATION
Filed Nov. 7, 1922

1,511,153

2 Sheets-Sheet 2

Edward R. Armstrong
Inventor

Patented Oct. 7, 1924.

1,511,153

UNITED STATES PATENT OFFICE.

EDWARD R. ARMSTRONG, OF PHILADELPHIA, PENNSYLVANIA.

SEA STATION.

Application filed November 7, 1922. Serial No. 599,544.

*To all whom it may concern:*

Be it known that I, EDWARD R. ARMSTRONG, a citizen of the Dominion of Canada, and a resident of Philadelphia, in the county of Philadelphia, State of Pennsylvania, have invented a certain new and useful Sea Station, of which the following is a specification.

This invention relates to sea stations or floating docks primarily intended to be used as aeroplane supply and navigating stations as disclosed in my U. S. Patent #1,378,394 granted May 17, 1921.

Commercial transportation by aeroplane over wide expanses of water, such as the Atlantic Ocean between New York and London, is practical only by the use of supply stations located at desirable intervals along the route, at which stations the fuel supply can be replenished and the many details of operation of such an airway properly conducted. But to those acquainted with the roughness of the ocean under storm conditions it is obvious how hazardous it would be to attempt to alight on the ocean near one of these stations during a storm in even the largest flying boat or hydro aeroplane, while taking off from the ocean under these conditions would be impossible. It is thus necessary for the continuous operation of an ocean airway using anchored aeroplane supply and navigating stations to so construct and control them that aeroplanes can land directly on them and take off from the same, and do so irrespective of weather conditions and the turbulence of the ocean.

It is the principal object of the present invention to provide for the landing on and the operation of aircraft from, such sea stations with safety under all weather conditions. To these ends, and also to improve generally on sea stations and methods of fixing the positions of the same the invention consists in the various matters hereinafter described and claimed.

To accomplish these objects I so design and construct a floating dock or sea station that the wind and waves have practically no effect on it, the result whereof is that the upper, or landing and take off deck, of the station will be steady and almost without movement at all times, even under storm conditions which would make the largest of the ocean going vessels roll and pitch to a dangerous extent.

In the carrying out of my invention, I, taking advantage of the fact that the wind waves of ocean storms are relatively only surface disturbances of the ocean (the greatest waves on record rarely creating any but the slightest movement at a depth of fifty feet below normal sea level) so design and construct the sea station that practically all its effective displacement is below the disturbance line of the maximum wave. By reason of this, it is subject to the action of the waves to a minor extent only, and so remains practically undisturbed in even the most furious storms.

A floating dock or sea station suitable for a landing platform for aeroplanes, should be of considerable extent, an effective size being 1200 feet long and 400 feet wide. To those skilled in the marine art it is apparent how difficult, not to say impossible, it would be to build a ship or floating dock of the usual type of the size indicated. According to my invention, the design of my sea station or floating dock is such that it is feasible to make one not only of the size mentioned but even, if necessary, of double the size.

For the purpose of illustrating my invention, but not restricting it thereto, I show in the accompanying drawings one embodiment thereof. In these drawings:—

Figure 2:
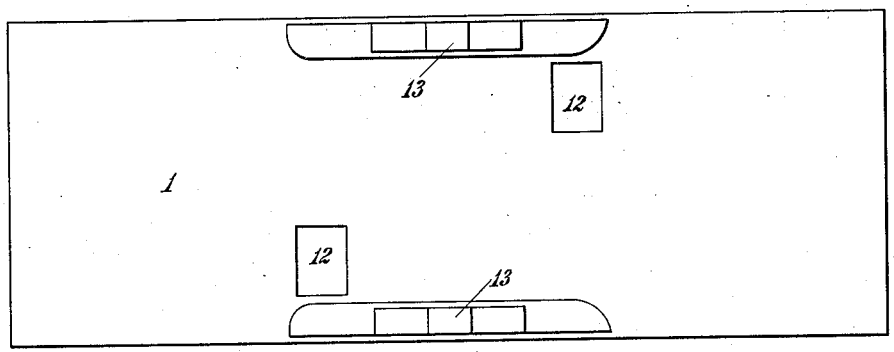
Figure 4:
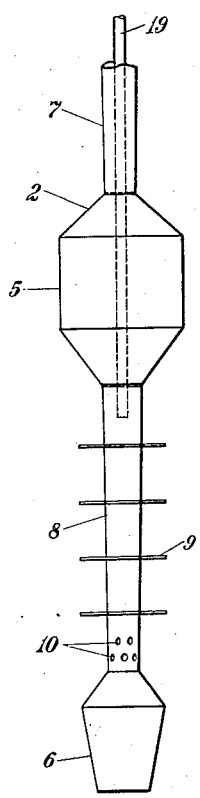
Figure 3:
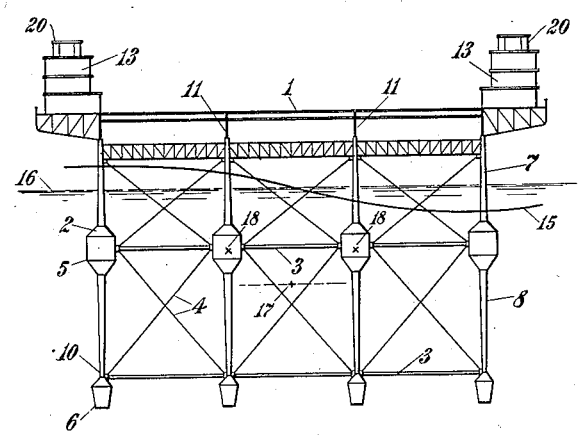

Fig. 1, is a side elevation showing a sea-station embodying the invention, the illustrated station being equipped with housing facilities for crew and supplies, Fig. 2, is a plan view showing the top of the station and landing platform illustrated in Fig. 1, Fig. 3, is a cross section of the sea station taken about at the centre of same, and Fig. 4, is an enlarged view of one of the displacement members or floats showing the method of displacement control.

Referring now to the drawings, the landing deck 1 of the sea station is supported on hollow buoylike displacement members 2, preferably of uniform size, spaced according to the deck load concentration as particular circumstances may dictate and connected to each other by spacing struts 3 and cross-ties 4. In accordance with the invention, the displacement members 2 are so designed that approximately 95 percent of their displacement is below the wave disturbance line.

For economy of construction the displacement members are divided into two main sections which I have designated as the load carrying section 5 and the stabilizing section 6. The portion 7 projecting from section 5 to the deck of the sea station may be cylindrical and is dimensioned primarily for strength rather than displacement. To offer effective resistance to vertical movement of displacement members 2 through the water the preferably cylindrical part 8, connecting with load carrying section 6 is provided with circular collars 9. Discharge openings 10 are provided at the base of the various sections 8 to allow the inlet and discharge of water from them as may be required to decrease or increase the displacement of the sea station as a whole, thereby to maintain the normal waterline 16 of the same practically constant despite variation in the live load to be supported by the dock when operating as an anchored aeroplane supply and navigating sea station.

To give statical stability to the sea station, stabilizing sections 6 are loaded with a suitable material, such as concrete, so that the centre of gravity 17 of the dock as a unit will be below the unit centre of buoyancy 18 of the displacement members 2, which centre of displacement is primarily determined by the size of load supporting section 5 and this in turn determined by the distributed deck load each displacement member 2 has to carry. The landing deck 1 is built up of structural steel trusses 11 which are so proportioned and spaced in the central sections that adequate storage and repair space is available for aeroplanes and the many other items incidental to the operation of such a dock as an aeroplane supply and navigating station.

For convenience in receiving and dispatching aeroplanes deck elevators 12 are provided so as to quickly clear the decks for arriving and departing planes. Living quarters, shops and storehouses 13 are located on top of the flying deck and at the extreme edges of the same so as to give the maximum clearance between them for the operation of the arriving and departing aeroplanes. For the regulation and operation of the airway the wireless aerial 14 is provided.

To illustrate the maximum rolling and pitching forces that the sea station might be subjected to the approximate contour 15 of a wave fifty feet high and eight hundred feet long is shown. The action of a wave of this size on the deck structure of the sea station is effective only against section 7 of displacement members 2, which force is so small as compared with the resistance and inertia of sections 5, 6 and 8 and resistance collars 9 of the displacement members as to be practically negligible as a disturbing force within the relatively short period of the passing wave which for the size given would be about eight seconds.

In order that the displacement of the members 2 may be varied at will, thereby to provide for variations in the live load on the dock while maintaining the same approximate water line 16, the section 8, of displacement members 2 are provided at their upper ends with a compressed air connection 19. By means of this connection compressed air at desired pressure, controlled by any suitable means, (not shown) from navigating quarters 20, or other suitable point, can be admitted and the pressure so regulated as to expel or admit, through the ports 10 the amount of water necessary to maintain the sea station at its normal water line 16 under varying conditions of the live load in a similar manner to that now used in standard floating docks. A differential control of the air pressure in sections 8 between the end and side displacement members is desirably used to obtain the proper trim of the dock longitudinally and laterally to compensate, if necessary, for uneven distribution of the live load on the landing deck.

I claim:—

1. In a floating dock, a float, a platform carried by the float above the same, means for connecting the float and platform, a weighty means below the float, means for connecting the weighty means and float, said elements being so related as to weight and proportions as to place said float below the disturbance line of the maximum wave and the centre of gravity of the floating dock below the centre of buoyancy of same.

2. In a floating dock, a float, a platform carried by the float above the same, means for connecting the float and platform, a weighty means below the float, means for connecting the weighty means and float, said elements being so related as to weight and proportions as to place said float below the disturbance line of the maximum wave and the centre of gravity of the floating dock below the centre of buoyancy of same, and said first named means being shaped to present but small surface to the waves.

3. In a floating dock, a float, a platform carried by the float above the same, means for connecting the float and platform, a weighty means below the float, means for connecting the weighty means and float, said elements being so related as to weight and proportions as to place said float below the disturbance line of the maximum wave and the centre of gravity of the floating dock below the centre of buoyancy of same, and said means for connecting weighty means and float provided with resistance members.

4. In a floating dock, a float, a platform carried by the float above the same, means for connecting the float and platform, a weighty means below the float, means for connecting the weighty means and float, said elements being so related as to weight and proportions as to place said float below the disturbance line of the maximum wave and the centre of gravity of the floating dock below the centre of buoyancy of same, and means for admitting the buoying liquid to or ejecting from the said means connecting weighty means and float.

5. In a floating dock, a float, a platform carried by the float above the same, means for connecting the float and platform, a weighty means below the float, means for connecting the weighty means and float, said elements being so related as to weight and proportions as to place said float below the disturbance line of the maximum wave and the centre of gravity of the floating dock below the centre of buoyancy of same, and said first named means being shaped to present but small surface to the waves, and said means for connecting weighty means and float provided with resistance members.

In testimony whereof I affix my signature.

EDWARD R. ARMSTRONG.